United States Patent Office 2,881,150
Patented Apr. 7, 1959

2,881,150

ESTERS OF DI-HYDROXY ALKYL SUBSTITUTED XYLENE

John J. Jaruzelski, Pittsburgh, Pa., assignor to Pittsburgh Plate Glass Company, Allegheny County, Pa., a corporation of Pennsylvania No Drawing. Application April 26, 1956
Serial No. 580,717

7 Claims. (Cl. 260—45.4)

This invention relates to polyesters of methylated aromatic compounds and carboxylic acids containing at least two carboxyl groups and to methods of preparing the same.

The polyesters of those dicarboxylic acids such as maleic acid and fumaric acid containing $$-\underset{H}{C}=\underset{H}{C}-$$

groups are adapted to react by addition with monomers containing terminal

groups.

More particularly the invention relates to polyesters derived from dihalomethyl-substituted xylenes and dicarboxylic acids or the anhydrides or salts of such acids.

Halomethyl derivatives of xylene having the structure:

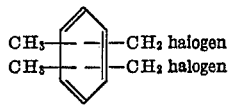

have heretofore been prepared by reacting a xylene or a mixture of xylenes with formaldehyde and a hydrogen halide, such as hydrochloric acid.

Such method is disclosed in an application to Alfred R. Bader, Serial Number 463,801, filed October 21, 1954, and again in an application to Frank Fekete, Serial Number 557,452, filed January 5, 1956.

This invention comprises the discovery that dihydroxymethyl-xylenes may be reacted with dicarboxylic acids or their anhydrides to form valuable polyesters. Polyesters of similar character may also be formed by reaction of dihalomethyl-xylenes and metal salts of dicarboxylic acids. A generalized formula of the polyesters is as follows:

Formula A

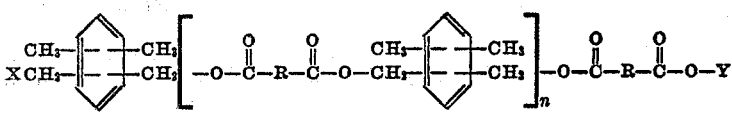

In the formula, X is halogen or —OH; R is alkylene or arylene, e.g. methylene, ethylene, propylene, butylene, hexylene or the like, up to 10 or more carbon atoms, $$-\underset{H}{C}=\underset{H}{C}-$$

as in fumaric or maleic acid, or phenylene, as in phthalic, terephthalic or isophthalic acid; Y is —H or metal; and $n$ is a whole number depending in value upon the length of the polyester chain.

In a related reaction, hydroxyalkoxymethyl-xylenes are reacted with dicarboxylic acids or anhydrides thereof to form polyesters of the generalized formula:

Formula B

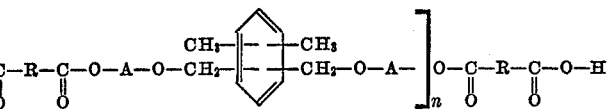

where R and $n$ have the foregoing significance.

Group A may be branched or straight, alkylene, e.g. such as in propylene or butylene, or it may be an ether as in the residue of diethylene or triethylene glycol. The parenthetical chains may be of any desired length, for example, from 1 unit in length to 10 or more units. Probably, the resin comprises a mixture of chains of various lengths.

The Formulae A and B may be consolidated as follows:

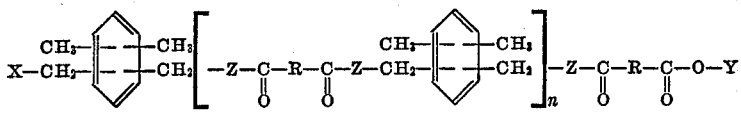

where X is of a class consisting of halogen and H—Z— where Z is of a class consisting of —O—,

—OCH$_2$CH$_2$O—, —CH$_2$CH$_2$OCH$_2$CH$_2$—O— and —OCH$_2$CH$_2$OCH$_2$CH$_2$OCH$_2$CH$_2$—O— and R is ethylenically unsaturated and Y has the significance previously given; $n$ is a number from about 1 to about 10.

These polyesters are valuable as resins and as plasticizers of resins and are often characterized by improved resistance to the absorption of moisture. This latter is a characteristic in which conventional alkyd resin obtained by esterification reactions between conventional polyhydric alcohols, such as glycol or glycerol, and dicarboxylic acids (or their anhydrides) such as phthalic acid, adipic acid, maleic acid and the like, are defective.

In the practice of the present invention various halomethyl-substituted xylenes may be employed as starting materials. However, because of general cheapness and availability, the chloro-substituted compounds are presently preferred.

For purposes of preparing alpha, alpha'-dichlorodurene, suitable for use in the practice of the present invention, a mixture is prepared comprising:

| | Parts by weight |
|---|---|
| m-Xylene | 848 |
| Formaldehyde (37 percent aqueous solution) | 1740 |
| Concentrated aqueous hydrochloric acid | 1800 |
| Zinc chloride (catalyst) | 40 |

The foregoing mixture is heated at 90° C. to 95° C. for 18 hours while hydrogen chloride gas is bubbled therethrough. The reaction mixture is cooled and a white solid is crystallized out which is filtered and washed with water, dried and crystallized from heptane to yield 869 parts by weight of 4,6-bis(chloromethyl)m-xylene melting in a range of 93° C. to 96° C. This product is suitable for use as a starting material in the preparation of polyesters in accordance with this invention.

The foregoing compound or dihydroxymethyl-xylene derived therefrom, may be reacted with dicarboxylic acids or anhydrides to form polyesters of the type represented in Formula A (preceding). In forming the polyesters, the two reaction components, preferably are employed in approximately stoichiometric ratios.

The application of the principles of this invention to the preparation of a polyester by the direct interaction of dichloromethyl-xylene and a salt of fumaric acid is illustrated by the following example:

EXAMPLE I

In this example, dimethyl formamide is employed as a solvent. It could be replaced by other solvents such as water, though in the latter instance, the yield is somewhat impaired. The reaction mixture comprises:

| | |
|---|---|
| Sodium fumarate | grams 40 |
| Dimethyl formamide | milliliters 270 |

These are mixed and heated to 100° C. and 51 grams of dichloromethyl-xylene are added. The mixture is refluxed for 6 hours, permitted to cool overnight, and the precipitate is filtered. The cake weighing 95 grams is washed first with water and then with 5 percent solution of hydrochloric acid and finally with water. The filtrate, when diluted with water yields an additional 18 grams of material which is subjected to the foregoing washing treatment. A total yield of 55 grams (90 percent) is obtained. The product has a melting point in a range of 125° C. to 150° C. The saponification number is 421.5. The acid number is 16.5. The product is primarily dimethyl-alpha,alpha'-xylylene fumarate in the form of a polyester. The product is suitable for incorporation with a monomer such as styrene, diallyl phthalate or the like to form a resinous mixture for purposes of interpolymerization to provide a plastic material. The resinifiable mixture may be cast, impregnated into fibrous materials, or spread upon surfaces, and then cured by baking or by being allowed to stand at room temperature.

EXAMPLE II

In accordance with this example, a mixture is prepared comprising 69 parts by weight (0.5 mol) of sodium hydrogen fumarate dissolved in 300 milliliters of dimethyl formamide. To the resultant solution is added 51 grams (0.25 mol) of solid dichloromethyl-xylene and the mixture is refluxed for 8 hours. The resultant reaction mixture is diluted with water to precipitate a sticky resinous material which is removed and dissolved in methyl isobutyl ketone-benzene mixture. The solution is washed with aqueous hydrochloric acid of 5 percent concentration and then is washed with water. The residue is dried and the solvent is distilled off. A yield of 42 grams (49 percent) of a resinous polyfumarate is obtained. Upon standing, the product solidifies. The solid melts over a range of 94° C. to 120° C. The saponification number is 296 and the acid number is 98.6. This resin can be used as an intermediate in the preparation of other resins. However, per se, its water resistance is low, owing to its high acidity.

The residue as obtained from distillation of the solvent may be mixed with styrene or other $>C=CH_2$ monomer along with benzoyl peroxide or other peroxide catalyst and the mixture cured to provide a plastic material.

EXAMPLE III

Part 1

A slurry comprising 71.5 grams (.375 mol) of sodium adipate dissolved in 300 grams of dimethyl formamide is mixed with 76.5 grams (0.375 mole) of dichloromethyl-xylene and the mixture is heated and stirred for 10 hours at a temperature of 140° C. to 150° C. At the end of this time, the reaction is deemed to be complete. The sodium chloride (45 grams) precipitated in the mixture is filtered off. The filtrate is diluted with 250 milliliters of benzene and 500 milliliters of methyl isobutyl ketone. The mixture is washed with water and the solvent is distilled off under vacuum while being blown with carbon dioxide. A resinous product which solidifies upon standing and melts at 55° C. to 58° C. is obtained in a yield of 102 grams (98 percent). This product has a solids content of 96.4, a saponification number of 403 as against a calculated saponification number of 405.

Part 2

In accordance with this example, water is employed as a reaction medium in forming a polyester. A solution of 62.5 grams of sodium adipate in 150 milliliters of water is heated to 100° C. and is treated with 65 grams of dichloromethylxylene. The mixture is refluxed for 10 hours with agitation. The resultant product is poured on ice, washed with water and then is mixed with toluene. The mixture of residual water and toluene is distilled off azeotropically. The resinous product is of light color and is obtained in a yield of 60 grams (69 percent). The saponification number is 354. The solids content is 99.4 percent.

It is also possible to prepare a polyester by preliminarily hydrolyzing a dichloromethyl-xylene and then reacting the resultant dihydroxymethyl-xylene with a dicarboxylic acid or an anhydride thereof. The hydrolysis of dichloromethyl-xylene may be conveniently conducted by heating with water, a mixture of dichloromethyl-xylene, sodium acetate and sodium hydroxide. The reaction proceeds in accordance with the equation:

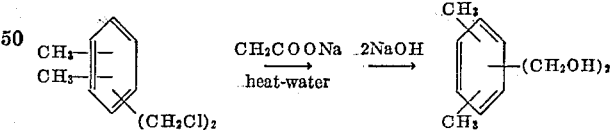

EXAMPLE IV

Hydrolysis of dichloromethyl-xylene was conducted as follows:

A solution of 214 grams (1.5 moles) of sodium acetate trihydrate in 100 milliliters of water is mixed with 75.5 grams (0.37 mole) of dichloromethyl-xylene and the mixture is refluxed with agitation for 10.5 hours. At this point, 150 grams of 20 percent aqueous sodium hydroxide is added and the mixture is heated with stirring until a pH value of 7 to 8 is attained. The mixture is then cooled and the product which precipitates is removed from the mother liquor by filtration.

The product is washed with water and dried. It is a white, amorphous solid which melts at 139° C. to 144° C. in a yield of 92 percent (57 grams). The product has a hydroxyl number of 600; is substantially chlorine-free. The product can melt in a range of 105° C. to 144° C. dependent upon the mixture of isomers of dichloromethyl-xylene which are treated.

A similar method is also applicable to the preparation of dimethylbenzyl alcohol. In this operation, a solution of 400 grams (4.87 moles) of sodium acetate in 600 milliliters of water is treated with 417 grams (2.78 moles) of monochloromethyl-xylene and the mixture is refluxed for 16 hours. At this point, a solution of 112 grams (2.78 moles) of sodium hydroxide in water is added and the mixture is further refluxed for an additional 4 hours. Then the organic layer is separated and distilled. The product is obtained in a yield of 315 grams (85 percent). It boils at a temperature in a range of 90° C. to 107° C. at a pressure of 0.8 to 1 millimeter of mercury absolute). The refractive index $n_D^{26}=1.5338$. The hydroxyl number is 413 as against a calculated hydroxyl number of 412.

EXAMPLE V

In accordance with this example, a polyester is prepared by reaction of dihydroxymethyl-xylene, such as is prepared by the reaction of Example IV, with a dicarboxylic acid. The charge comprises:

Maleic anhydride _____ 122.5 grams (1.25 moles).
Dihydroxymethyl-xylene ___ 276 grams (1.67 moles).
Xylene _____ 80 grams.

The xylene is employed as an azeotropic refluxing medium. The foregoing mixture is heated at 140° C. to 165° C. until no more water can be eliminated and it is then blown with inert gas to remove any light end product. A yield of 400 grams of resinous material is obtained which has a solids content of 89.7, a saponification number of 342 as against a calculated saponification number of 348. The acid number is 13.9 and the yield is 95 percent.

This polyester is diluted with 30 percent of styrene (percent based upon the mixture). The mixture is catalyzed with 1 percent of benzoyl peroxide, and is cured at 50° C. to 120° C. for 1 hour and at 120° C. for 1 hour, to provide a hard, tough plastic. The mixture may be employed in casting or in molding powders, or in impregnating fibrous materials.

EXAMPLE VI

In accordance with this example, di(beta-hydroxyethoxymethyl)xylene is prepared as follows: a mixture of 40 grams of sodium hydroxide and 300 milliliters of ethylene glycol is heated to 140° C. to 150° C. until all of the sodium hydroxide is dissolved. While the mixture is maintained at a temperature of 150° C., 102 grams (0.5 mole) of solid dichloromethyl-xylene is added. The reaction mixture is vigorously agitated and a reaction temperature of 140° C. is maintained for 4 hours. The reaction mixture is cooled and then filtered in order to remove precipitated sodium chloride. Any excess glycol is stripped off and the residue is filtered and distilled.

A yield of 105 grams (87 percent) of a product boiling in a range of 105° C. to 205° C. at a pressure of 0.8 to 1 millimeter of mercury and having a refractive index of $n_D^{23}=1.5307$ is obtained. The product has a hydroxyl number of 428 as against a calculated number of 441. The density at 23° C. is 1.117 gram/ml., $M_r=70.63$, calculated 70.20.

EXAMPLE VII

In accordance with the provisions of this example, di(beta-hydroxyethoxymethyl)xylene prepared as in Example VI is reacted with maleic anhydride to provide a polyester. The reaction mixture comprises;

Di(beta-hydroxyethoxymethyl)xylene ____grams__ 200
Maleic anhydride _____do____ 63.5
Xylene _____milliliters__ 70

The xylene constitutes an azeotropic medium for removal of water from the charge. The foregoing mixture is introduced into a three-necked flask equipped with a reflux condenser, mechanical stirrer, water separator and a gas inlet tube. The charge is heated at 165° C. to 200° C. until no more water is eliminated, the xylene is then distilled off and the resin is blown with carbon dioxide for 10 minutes. The product is obtained in a yield of 257 grams (99.5 percent) and is an amber yellow resin of a solids content of 98.6 percent; it has a saponification number of 281 (as against a calculated saponification number of 289); an acid number of 20.8; and a hydroxyl number of 75.7.

The foregoing resin is dissolved in 30 percent styrene, 1 percent of benzoyl peroxide is added as a catalyst, and the mixture is cured by baking. The resultant plastic is flexible.

EXAMPLE VIII

In accordance with the provisions of this example, dihydroxymethyl-xylene prepared as in Example IV and ethylene glycol are reacted with maleic anhydride to provide a polyester. The reaction mixture comprises:

|  | Grams |
|---|---|
| Dihydroxymethyl-xylene | 170 |
| Ethylene glycol | 63 |
| Maleic anhydride | 180 |
| Xylene | 70 |

The reaction mixture is heated at 160° C. to 175° C. for 6 hours. Water is evolved and azeotropically removed from the reaction mixture. At the conclusions of the foregoing period, 5 milliliters of ethylene glycol are added and the heating is continued until the elimination of water has subsided. The temperature is then increased to 190° C. for 30 minutes, the resin is blown with carbon dioxide to remove light end products.

The polyester in a yield of 317 grams (92.5 percent) is a hard resin of a solids content of 98.7, a saponification number of 503 (as against a calculated saponification number of 514) and an acid number of 1.52. The resin is diluted with styrene to provide a liquid interpolymerizable mixture. The mixture can be stabilized against premature gelation by addition of 0.001 to 0.5 percent by weight of hydroquinone or t-butyl catechol. The mixture can be mixed with 1 percent of peroxidic catalyst and cured by baking at 75° C. to 250° C. to a hard, tough plastic state. The interpolymerizable mixture of polyester and styrene is suitable for castings, for coating and for impregnating.

EXAMPLE IX

In this example, dihydroxymethyl-xylene and di(beta-hydroxyethoxymethyl)xylene prepared in the manner already described are mixed and the mixture is esterified with adipic acid to provide a mixed polyester. The esterification mixture is of the following composition:

Dihydroxymethyl-xylene _____grams__ 120
Di(beta-hydroxyethoxymethyl)xylene _____do____ 145
Adipic acid _____do____ 180
Xylene _____milliliters__ 100

The reaction mixture is refluxed at a temperature of 150° C. to 165° C. until 29.8 milliliters of water has been eliminated. At this point, a small amount (about 0.1 gram) of paratoluene sulfonic acid is added as an esterification catalyst and reaction is continued until a total 31.8 milliliters of water are removed or until the elimination of water has ceased.

The solvent is removed by heating and concurrently blowing the reaction mixture with carbon dioxide while the mixture is subjected to vigorous stirring until a temperature of 188° C. is attained, heating is then discontinued. Blowing with inert gas (carbon dioxide), however, is continued at an increased rate until the temperature drops to 145° C. The product is discharged at 145° C. and is then cooled.

A yield of 389 grams (94 percent) of resin is obtained. The resin is of a solids content of 99.7 percent; hydroxyl number of 157; acid number of 15.2; a saponification number of 356 (as against the calculated number of 347); the viscosity is $Z_6$ and the Gardner color is 6–7.

The resin, in an amount of about 100 parts by weight, is mixed with tolylene diisocyanate isomers in an amount of about 25 to 50 parts by weight, a catalyst such as N-methyl morpholine, a dispersing agent such as a commercial alkaryl polyether sulfonate sold as Triton–X–200, water, and then is reacted to provide a polyurethane foam.

It has previously been indicated that the interpolymers of monomers containing >C=CH$_2$ groups and polyesters prepared in accordance with the provisions of this invention are characterized by improved resistance to permeation by water. For purposes of comparison, tests have been conducted upon the interpolymers of:

(A) A mixture of 1 part by weight of styrene and 2 parts by weight of a polyester of propylene glycol and equal moles of maleic acid and phthalic acid. This is a typical commercial interpolymerizable mixture and is employed as a control.

(B) An interpolymer of approximately 1 part of styrene and 2 parts by weight of a polyester of dihydroxymethyl-xylene and maleic anhydride. The polyester of this example was prepared in accordance with the provisions of Example V.

(C) An interpolymer of 1 part by weight of styrene and 2 parts by weight of a polyester of maleic anhydride and dihydroxyethoxydimethyl-xylene.

(D) An interpolymer of 1 part by weight of styrene and 2 parts by weight of a polyester of maleic anhydride and di(beta-hydroxyethoxymethyl)xylene.

Moisture tests were conducted by soaking the samples to be tested for a period of 24 hours at 77° F. and the percentage of water absorption was then determined.

The results of the several tests are tabulated as follows:

|                  | Percent by weight of water absorbed |
|------------------|-------------------------------------|
| Interpolymer (A) | 0.30                                |
| Interpolymer (B) | 0.040                               |
| Interpolymer (C) | 0.169                               |
| Interpolymer (D) | 0.094                               |

It is to be observed that all of the interpolymers of styrene and polyesters derived from maleic acid and a hydroxy derivative of dichloromethyl-xylene are substantially superior and in some instances very superior to the interpolymer of styrene and the commercial polyester of propylene glycol and equal moles of maleic acid.

Styrene has been referred to as a monomer suitable for interpolymerization with the polyesters of this invention. It may be replaced by other monomers containing >C=CH$_2$ groups attached to negative groups. Examples comprise:

Esters such as—
    Diallyl phthalate
    Vinyl acetate
    Diallyl succinate
    Diallyl itaconate Amides such as—
    Acrylamide
    Methacrylamide
Nitriles such as—
    Acrylonitrile
Hydrocarbons such as—
    Vinyl toluene
    Divinyl benzene Monomers may be employed in amounts of 5 to 60 percent by weight based upon the total mixture.

The polyesters of this invention may be mixed with other liquid, soluble polyesters such as those of phthalic acid or adipic acid and alcohols containing two or more hydroxyls, such as:

Ethylene glycol
    Propylene glycol
    Diethylene glycol
    Glycerol
    Pentaerythritol The mixtures may be employed for coatings, for reaction with diisocyanates and the like.

I claim:

1. As a new material a polyester of dihydroxymethyl xylene and maleic acid.

2. As a new material a polyester of dihydroxymethyl xylene and fumaric acid.

3. As a new material a polyester of dihydroxymethyl xylene and alpha, beta-ethylenic dicarboxylic acid.

4. As a new material an interpolymer of a monomer containing a >C=CH$_2$ group and a polyester as defined in claim 1.

5. As a new material an interpolymer of a monomer containing a >C=CH$_2$ group and a polyester as defined in claim 3.

6. As a new material a polyester of dihydroxymethyl-xylene and an acid of a class consisting of maleic acid and fumaric acid.

7. A polyester of the formula:

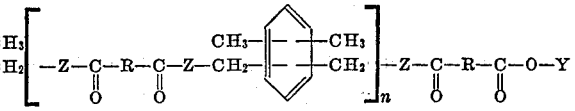

where X is of a class consisting of halogen and HZ—, Z being of a class consisting of —O—, —O—CH$_2$CH$_2$O—,

—O—CH$_2$CH$_2$CH$_2$—O—

—O—CH$_2$CH$_2$OCH$_2$CH$_2$—O— and

—O—CH$_2$CH$_2$OCH$_2$CH$_2$OCH$_2$CH$_2$—O—

Y being of a class consisting of hydrogen and alkali metal and R being of a class consisting of an ethylenically unsaturated alkylene group, a saturated alkylene group and an arylene group and n is a whole number from about 1 to about 10.

References Cited in the file of this patent

UNITED STATES PATENTS

| 2,647,099 | Smith | July 28, 1953 |
| 2,806,834 | Nischk et al. | Sept. 17, 1957 |

UNITED STATES PATENT OFFICE
CERTIFICATE OF CORRECTION

Patent No. 2,881,150                                                          April 7, 1959

John J. Jaruzelski

It is hereby certified that error appears in the printed specification of the above numbered patent requiring correction and that the said Letters Patent should read as corrected below.

Column 2, line 45, the formula should appear as shown below instead of as in the patent:

column 4, line 6, for "peroxide", second occurrence, read -- peroxidic --; column 6, line 42, for "poleyster" read -- polyester --.

Signed and sealed this 10th day of November 1959.

(SEAL)
Attest:

KARL H. AXLINE
Attesting Officer

ROBERT C. WATSON
Commissioner of Patents